US008131246B2

(12) United States Patent
Yamada

(10) Patent No.: US 8,131,246 B2
(45) Date of Patent: Mar. 6, 2012

(54) HIGH-FREQUENCY CIRCUIT HAVING FILTERING FUNCTION AND RECEPTION DEVICE

(75) Inventor: Atsushi Yamada, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 662 days.

(21) Appl. No.: 12/324,730

(22) Filed: Nov. 26, 2008

(65) Prior Publication Data

US 2009/0181635 A1 Jul. 16, 2009

(30) Foreign Application Priority Data

Dec. 17, 2007 (JP) ................................ 2007-324827

(51) Int. Cl.
*H04B 1/10* (2006.01)
*H01P 3/08* (2006.01)

(52) U.S. Cl. ......... 455/307; 455/327; 333/204; 333/238

(58) Field of Classification Search .................. 455/325, 455/326, 327, 280, 293, 307, 337; 333/116, 333/128, 204, 219, 238, 246

See application file for complete search history.

(56) References Cited

U.S. PATENT DOCUMENTS 3,688,225 A * 8/1972 Cohn ............................ 333/204
4,873,501 A 10/1989 Hislop
5,321,374 A 6/1994 Uwano
5,584,067 A * 12/1996 Buer et al. .................... 455/302
6,624,729 B2 * 9/2003 Wright et al. ................. 333/238
2004/0070312 A1 * 4/2004 Penunuri et al. .......... 310/313 A

FOREIGN PATENT DOCUMENTS

JP 63-133701 U 9/1988
JP 02-134706 U 11/1990
JP 2-295202 A 12/1990
JP 5-29818 A 2/1993
JP 07-283621 A 10/1995
JP 2001-320202 A 11/2001
JP 2003-304102 A 10/2003
JP 2006-20249 A 1/2006

OTHER PUBLICATIONS

Deleniv et al., "Novel Band-Pass Filter Utilizing S-Shaped Slot Line Resonators", IEEE MTT-S International Microwave Symposium Digest, IEEE, Jun. 2003, vol. 3, pp. 1081-1084.

* cited by examiner

*Primary Examiner* — Howard Williams

(74) *Attorney, Agent, or Firm* — Birch, Stewart, Kolasch & Birch, LLP

(57) ABSTRACT

A high-frequency circuit includes a dielectric substrate, a stripline formed on a surface of the dielectric substrate, a ground conductor provided on a back surface of the dielectric substrate, in which a pattern cut-out portion through which a part of the back surface of the dielectric substrate is exposed is formed, and a stub having a first end connected to an edge portion of the ground conductor defining the pattern cut-out portion and a second end arranged at a distance from the edge portion.

10 Claims, 8 Drawing Sheets

HIGH-FREQUENCY CIRCUIT HAVING FILTERING FUNCTION AND RECEPTION DEVICE

This nonprovisional application is based on Japanese Patent Application No. 2007-324827 filed on Dec. 17, 2007 with the Japan Patent Office, the entire contents of which are hereby incorporated by reference.

BACKGROUND OF TH INVENTION

1. Field of the Invention

The present invention relates to a high-frequency circuit and a reception device, and particularly to a high-frequency circuit having a filtering function and a reception device.

2. Description of the Background Art

In general, a filter circuit allowing passage of a prescribed frequency component such as a frequency component from approximately 10 GHz to 12 GHz in a received high-frequency signal is employed in a satellite broadcast reception device. Conventionally, a microstrip type half-wave filter has widely been used as such a filter circuit.

For example, Japanese Utility Model Laying-Open No. 02-134706 (Patent Document 1) discloses the following filter as such a microstrip type filter. Specifically, in a microstrip coupled-line type band-pass filter including a plurality of coupled-lines each consisting of a pair of microstrip lines in parallel, a ground conductor in a portion occupied by the coupled-lines in an input portion and an output portion is removed.

In addition, Japanese Patent Laying-Open No, 2001-320202 (Patent Document 2) discloses the following filter. Specifically, the filter includes a dielectric substrate, a microstrip conductor metal film formed on a surface of the dielectric substrate, a back-surface metal film formed over the entire back surface of the dielectric substrate, and a plurality of internal spaces formed at prescribed intervals along a direction of extension of the microstrip conductor metal film at a position directly under the microstrip conductor metal film in the inside of the dielectric substrate.

Moreover, Japanese Patent Laying-Open No. 07-283621 (Patent Document 3) discloses the following directional coupler. Specifically, in improving directional characteristics of an asymmetrical directional coupler in which a back surface of a printed board serves as a ground conductor and a coupler line shaped like a pair of tapered openings is provided on an upper surface in a microstrip line, a pattern cut-out obtained by cutting away the ground conductor in a triangular shape is provided in the ground conductor directly under the back surface of the coupler line, as means for mitigating difference in an effective dielectric constant between even-mode propagation and odd-mode propagation.

In a half-wave filter, a plurality of resonators having an electrical length comparable to approximately ½ of a wavelength corresponding to each frequency of a signal in a frequency band that should pass through the filter are required. Accordingly, an area occupied by the filter is disadvantageously large.

A configuration for forming a trap by connecting an open stub having an electrical length comparable to ¼ of the wavelength corresponding to a frequency of a signal to be attenuated to a transmission line is possible as a configuration for attenuating a signal having a specific frequency. In such a trap as well, a space for connecting an open stub should be ensured, and layout of a circuit pattern is restricted.

Patent Documents 1 to 3, however, are silent about a configuration for solving these problems.

SUMMARY OF THE INVENTION

An object of the present invention is to provide a high-frequency circuit and a reception device capable of achieving a smaller size and a simplified layout design.

A high-frequency circuit according to one aspect of the present invention includes: a dielectric substrate; a stripline formed on a surface of the dielectric substrate; a ground conductor provided on a back surface of the dielectric substrate in which a pattern cut-out portion through which a part of the back surface of the dielectric substrate is exposed is formed; and a first stub having a first end connected to an edge portion of the ground conductor defining the pattern cut-out portion and a second end arranged at a distance from the edge portion.

Preferably, in the pattern cut-out portion, a first space and a second space are formed on opposing sides of the first stub, and the first space and the second space are connected to each other around the second end of the first stub.

Preferably, the stripline and the first stub are arranged in parallel.

Preferably, the high-frequency circuit attenuates a component of a prescribed frequency in a signal that passes through a microstrip line, and the first stub has an electrical length comparable to approximately ¼ of a wavelength corresponding to the prescribed frequency.

Preferably, the high-frequency circuit further includes a metal chassis in contact with the ground conductor and surrounding the pattern cut-out portion and the first stub at a distance therefrom.

Preferably, the high-frequency circuit further includes a second stub having a first end connected to the edge portion of the ground conductor defining the pattern cut-out portion and a second end arranged at a distance from the edge portion.

More preferably, the first stub and the second stub extend from the edge portion in a direction opposite to each other.

More preferably, the first stub and the second stub are arranged in parallel, at a prescribed distance from each other.

Preferably, the stripline includes a coupled-line formed in a portion opposed to the pattern cut-out portion, with the dielectric substrate being interposed.

A reception device according to one aspect of the present invention includes a filter outputting a received radio signal after attenuating a frequency component thereof outside a prescribed frequency band, and a mixer circuit frequency-converting the radio signal received from the filter, and the filter includes a dielectric substrate, a stripline formed on a surface of the dielectric substrate, a ground conductor provided on a back surface of the dielectric substrate, in which a pattern cut-out portion through which a part of the back surface of the dielectric substrate is exposed is formed, and a first stub having a first end connected to an edge portion of the ground conductor defining the pattern cut-out portion and a second end arranged at a distance from the edge portion.

Preferably, the mixer circuit includes a flip-chip-mounted high electron mobility transistor.

According to the present invention, a smaller size and a simplified layout design can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
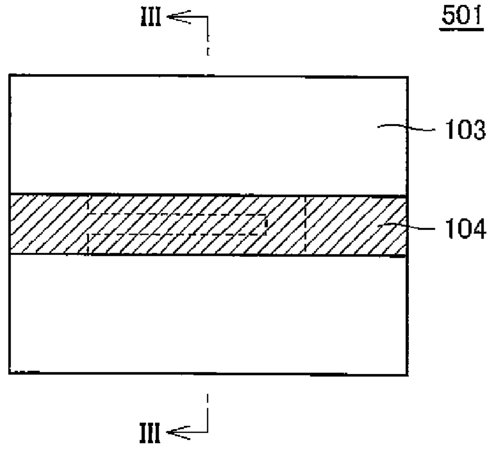
FIG. 1 is a diagram showing a configuration on a surface of a dielectric substrate in a high-frequency circuit according to a first embodiment of the present invention.

An embodiment of the present invention will be described hereinafter with reference to the drawings. In the drawings, the same or corresponding elements have the same reference characters allotted, and detailed description thereof will not be repeated.

First Embodiment

Figure 2:
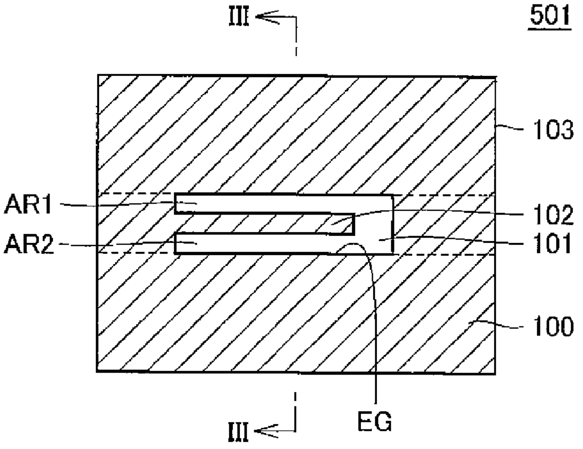
FIG. 2 is a diagram showing a configuration on a back surface of the dielectric substrate in the high-frequency circuit according to the first embodiment of the present invention.

FIG. 1 is a diagram showing a configuration on a surface of a dielectric substrate in a high-frequency circuit according to a first embodiment of the present invention. FIG. 2 is a diagram showing a configuration on a back surface of the dielectric substrate in the high-frequency circuit according to the first embodiment of the present invention. In FIGS. 1 and 2, dotted lines show patterns in the surface and in the back surface of the dielectric substrate, respectively.

Figure 3:
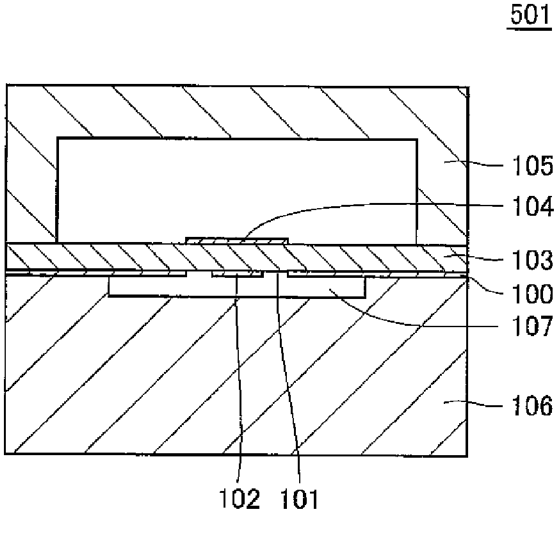
FIG. 3 is a cross-sectional view of the high-frequency circuit according to the first embodiment of the present invention along the line III-III in FIGS. 1 and 2.

FIG. 3 is a cross-sectional view of the high-frequency circuit according to the first embodiment of the present invention along the line III-III in FIGS. 1 and 2.

Referring to FIGS. 1 to 3, a high-frequency circuit 501 includes a ground conductor 100, a pattern cut-out portion 101, a stub 102, a dielectric substrate 103, a microstrip line 104, a frame 105, and a chassis 106.

For example, dielectric substrate 103 has a thickness of 500 μm and a dielectric constant of 3.33. Microstrip line 104 is formed on the surface of dielectric substrate 103. Ground conductor 100 is formed on the back surface of dielectric substrate 103.

Microstrip line 104 has a line width, for example, of 1.1 mm. When a conductor pattern is provided over the entire back surface of microstrip line 104, characteristic impedance of microstrip line 104 is approximately 50Ω.

Pattern cut-out portion 101 is formed in ground conductor 100. Specifically, pattern cut-out portion 101 is a region in the back surface of dielectric substrate 103 formed by removing a part of ground conductor 100. A part of the back surface of dielectric substrate 103 is exposed through this pattern cut-out portion 101.

In pattern cut-out portion 101, stub 102 which is a line having a first end connected to ground conductor 100 and a second open end is formed. More specifically, stub 102 has the first end connected to an edge portion EG defining pattern cut-out portion 101 and the second end arranged at a distance from edge portion EG. In pattern cut-out portion 101, a space AR1 and a space AR2 are formed on opposing sides of stub 102, and space AR1 and space AR2 are connected to each other around the second end of stub 102.

Stub 102 has an electrical length comparable to approximately ¼ of a wavelength corresponding to a frequency of a signal to be attenuated. According to this feature, a trap having such a characteristic as attenuating a desired frequency component can be achieved.

In addition, microstrip line 104 and stub 102 are arranged in parallel, with dielectric substrate 103 lying therebetween. According to such a feature, a degree of coupling between microstrip line 104 and stub 102 can be improved, and hence a steeper attenuation characteristic can be achieved.

Dielectric substrate 103 is mounted, for example, on chassis 106 made of aluminum. In addition, the surface side of dielectric substrate 103 is covered, for example, with frame 105 made of aluminum. Frame 105 and chassis 106 serve as a shield for a circuit surrounded thereby. Influence of noise originating from the outside of high-frequency circuit 501 can thus be avoided.

Here, a gap 107 is provided in a top portion of chassis 106 such that pattern cut-out portion 101 and stub 102 are not in contact with chassis 106. A depth of gap 107 is set, for example, to 500 μm, which is as great as the thickness of dielectric substrate 103.

In addition, gap 107 is formed large enough to accommodate pattern cut-out portion 101 and stub 102 in the back surface of dielectric substrate 103, in consideration of variation and tolerance in assembly of high-frequency circuit 501. Specifically, chassis 106 comes in contact with ground conductor 100 and surrounds pattern cut-out portion 101 and stub 102 at a distance therefrom. According to such a feature, pattern cut-out portion 101 and stub 102 can be shielded so that influence of external noise can be avoided.

Figure 4:
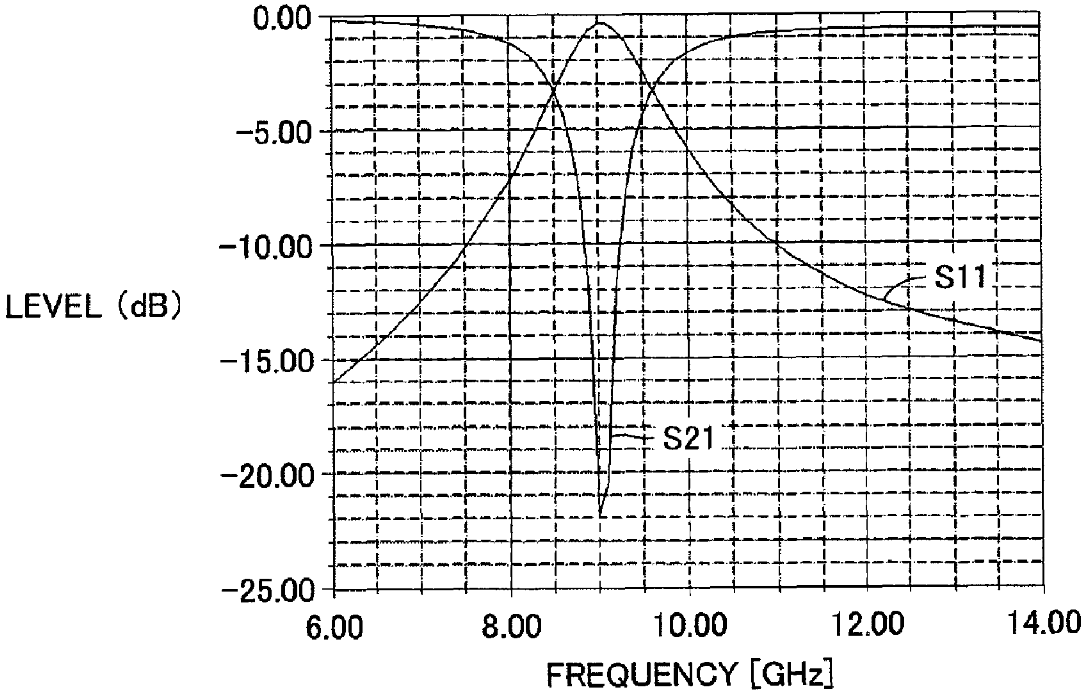
FIG. 4 is a diagram showing an S parameter in the high-frequency circuit according to the first embodiment of the present invention.

FIG. 4 is a diagram showing an S parameter in the high-frequency circuit according to the first embodiment of the present invention. FIG. 4 shows a case where stub 102 has a length of 5.3 mm. In FIG. 4, S11 represents a level of a signal reflected by microstrip line 104 and S21 represents a level of a signal transmitted through microstrip line 104.

Referring to FIG. 4, it can be seen that a frequency component around 9 GHz in a signal passing through microstrip line 104 is abruptly attenuated because of resonation of stub 102 around 9 GHz. By thus appropriately setting a length of stub 102, high-frequency circuit 501 can operate as a trap for a desired frequency.

Here, a Teflon®-based substrate is used as dielectric substrate 103, however, the substrate is not limited as such, and a glass epoxy substrate, a ceramic substrate, and the like may be employed.

In a half-wave filter, a plurality of resonators having an electrical length comparable to approximately ½ of a wavelength corresponding to each frequency of a signal in a frequency band that should pass through the filter are required. Accordingly, an area occupied by the filter is disadvantageously large. In addition, in a configuration for forming a trap by connecting an open stub to a transmission line, a space for connecting an open stub should be ensured, and layout of a circuit pattern is restricted.

On the other hand, the high-frequency circuit according to the first embodiment of the present invention includes dielectric substrate 103, microstrip line 104 formed on the surface of dielectric substrate 103, ground conductor 100 provided on the back surface of dielectric substrate 103, in which pattern cut-out portion 101 through which a part of the back surface of dielectric substrate 103 is exposed is formed and stub 102 having the first end connected to edge portion EG defining pattern cut-out portion 101 and the second end arranged at a distance from edge portion EG. According to such a feature, it is not necessary to form a resonator or a stub on the surface of the dielectric substrate, and hence a greater occupied area can be avoided. In addition, it is not necessary to ensure a space for connecting a stub on the surface of the dielectric substrate, and restriction on layout of a circuit pattern can be prevented.

Therefore, the high-frequency circuit according to the first embodiment of the present invention can achieve a smaller size and a simplified layout design.

Another embodiment of the present invention will now be described with reference to the drawings. In the drawings, the same or corresponding elements have the same reference characters allotted, and description thereof will not be repeated.

Second Embodiment

The present embodiment relates to a high-frequency circuit in which one stub is additionally provided as compared with the high-frequency circuit according to the first embodiment. The high-frequency circuit here is the same as the high-frequency circuit according to the first embodiment except for the features described below.

Figure 5:
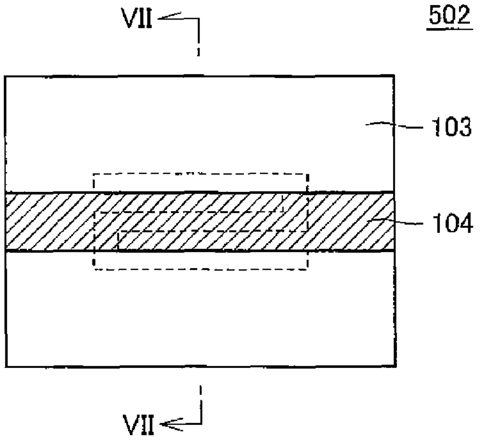
FIG. 5 is a diagram showing a configuration on a surface of a dielectric substrate in a high-frequency circuit according to a second embodiment of the present invention.
Figure 6:
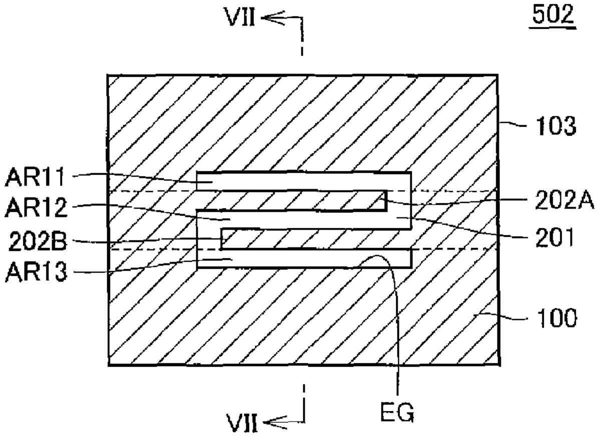
FIG. 6 is a diagram showing a configuration on a back surface of the dielectric substrate in the high-frequency circuit according to the second embodiment of the present invention.

FIG. 5 is a diagram showing a configuration on a surface of a dielectric substrate in a high-frequency circuit according to the second embodiment of the present invention. FIG. 6 is a diagram showing a configuration on a back surface of the dielectric substrate in the high-frequency circuit according to the second embodiment of the present invention. In FIGS. 5 and 6, dotted lines show patterns in the surface and the back surface of the dielectric substrate, respectively.

Figure 7:
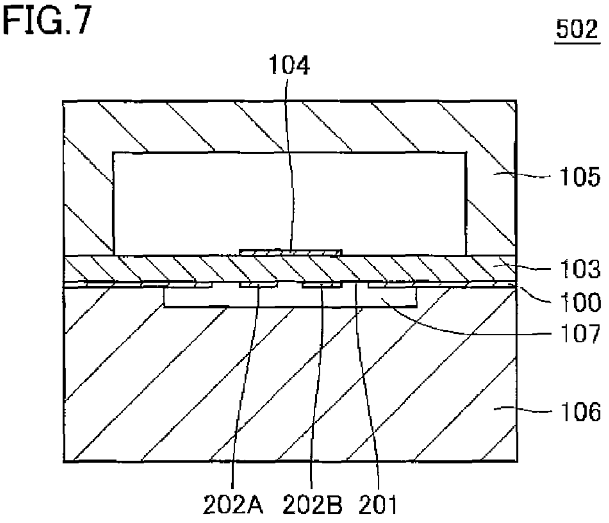
FIG. 7 is a cross-sectional view of the high-frequency circuit according to the second embodiment of the present invention along the line VII-VII in FIGS. 5 and 6.

FIG. 7 is a cross-sectional view of the high-frequency circuit according to the second embodiment of the present invention along the line VII-VII in FIGS. 5 and 6.

Referring to FIGS. 5 to 7, a high-frequency circuit 502 includes ground conductor 100, a pattern cut-out portion 201, stubs 202A, 202B, dielectric substrate 103, microstrip line 104, frame 105, and chassis 106.

In pattern cut-out portion 201, stubs 202A and 202B each having a first end connected to ground conductor 100 and an open other end are formed. More specifically, each of stubs 202A and 202B has the first end connected to edge portion EG defining pattern cut-out portion 201 and a second end arranged at a distance from edge portion EG. In pattern cut-out portion 201, a space AR11 and a space AR12 are formed on opposing sides of stub 202A, and space AR11 and space AR12 are connected to each other around the second end of stub 202A. In addition, space AR12 and a space AR13 are formed on opposing sides of stub 202B, and space AR12 and space AR13 are connected to each other around the second end of stub 202B.

Each of stubs 202A and 202B has an electrical length comparable to approximately ¼ of a wavelength corresponding to a frequency of a signal to be attenuated. A length of stubs 202A and 202B is set, for example, to 5.8 mm. According to this feature, a trap having such a characteristic as attenuating a desired frequency component can be achieved. In addition, a rejection bandwidth, that is, a frequency bandwidth achieving an attenuation not lower than a prescribed level, of high-frequency circuit 502 can be expanded.

In addition, microstrip line 104 and stubs 202A and 202B are arranged in parallel, with dielectric substrate 103 lying therebetween. According to such a feature, a degree of coupling between microstrip line 104 and stubs 202A and 202B can be improved, and hence a steeper attenuation characteristic can be achieved.

Moreover, stubs 202A and 202B extend from opposing sides of edge portion EG in a direction opposite to each other. According to such a feature, a rejection bandwidth of high-frequency circuit 502 can further be expanded.

Further, stubs 202A and 202B are arranged in parallel at a prescribed distance from each other. According to such a feature, two stubs can more strongly be coupled. Therefore, by appropriately setting a distance between stubs 202A and 202B, a desired rejection bandwidth can be obtained.

Figure 8:
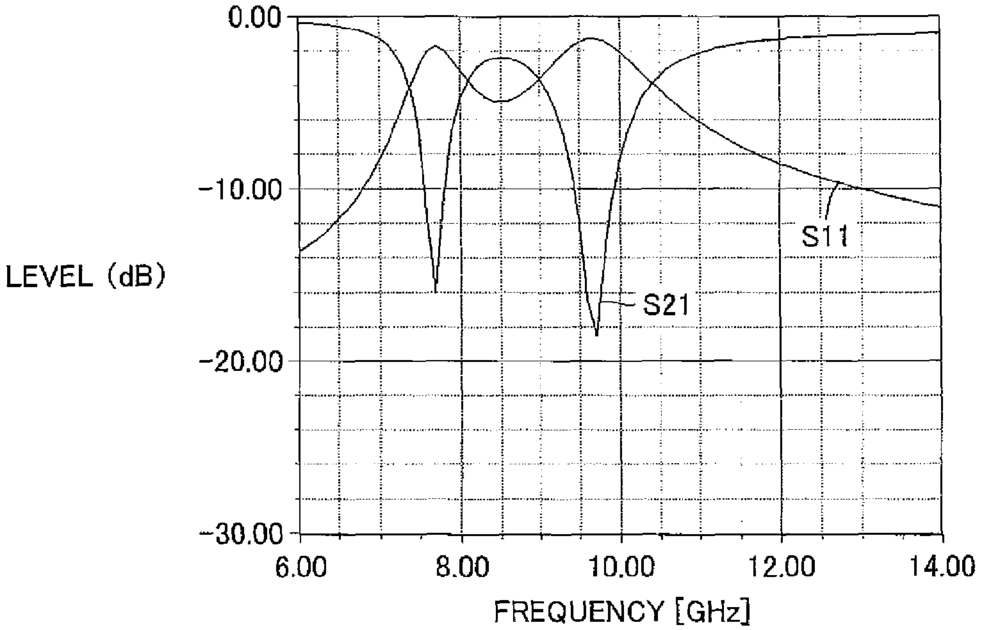
FIGS. 8 to 10 are diagrams showing S parameters in the high-frequency circuit according to the second embodiment of the present invention.
Figure 9:
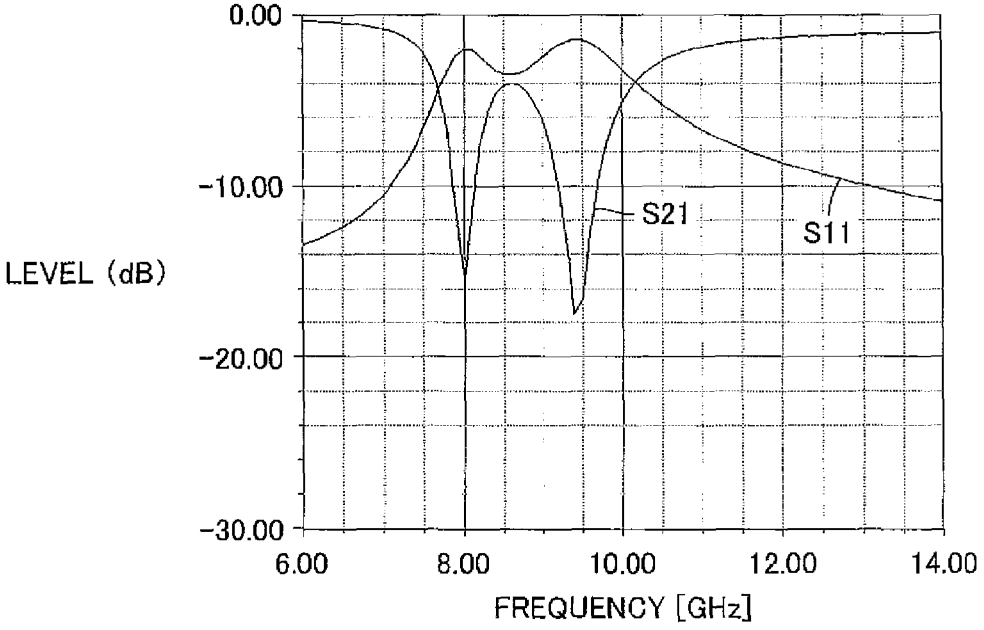
Figure 10:
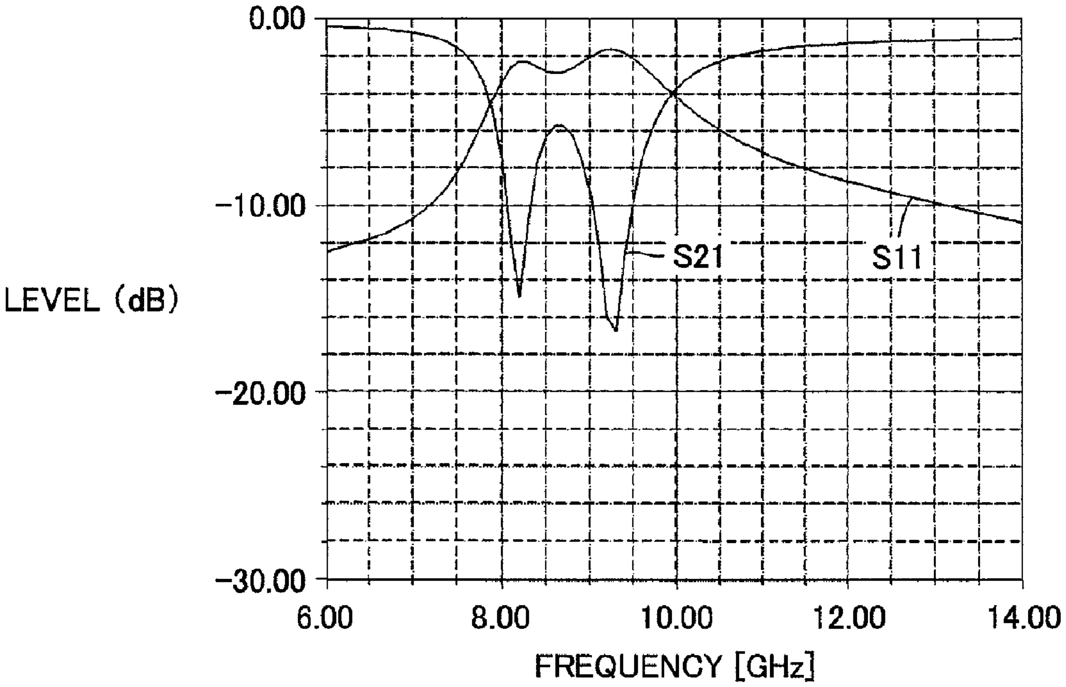

FIGS. 8 to 10 are diagrams showing S parameters in the high-frequency circuit according to the second embodiment of the present invention. FIGS. 8 to 10 show cases where distances between stubs 202A and 202B are set to 0.5 mm, 0.7 mm, and 0.9 mm, respectively. In FIGS. 8 to 10, S11 shows a level of a signal reflected by microstrip line 104 and S21 shows a level of a signal transmitted through microstrip line 104.

Referring to FIGS. 8 to 10, it can be seen that high-frequency circuit 502 can achieve a wider rejection bandwidth than high-frequency circuit 501.

In addition, it can be seen that a wider rejection bandwidth can be achieved as stubs 202A and 202B are closer to each other.

As the configuration and the operation are otherwise the same as in the high-frequency circuit according to the first embodiment, detailed description will not be repeated here. Therefore, the high-frequency circuit according to the second embodiment of the present invention can achieve a smaller size and a simplified layout design.

Another embodiment of the present invention will now be described with reference to the drawings. In the drawings, the same or corresponding elements have the same reference characters allotted, and description thereof will not be repeated.

Third Embodiment

The present embodiment relates to a high-frequency circuit in which a coupled-line is formed in a microstrip line as compared with the high-frequency circuit according to the second embodiment. The high-frequency circuit here is the same as the high-frequency circuit according to the second embodiment except for the features described below.

Figure 11:
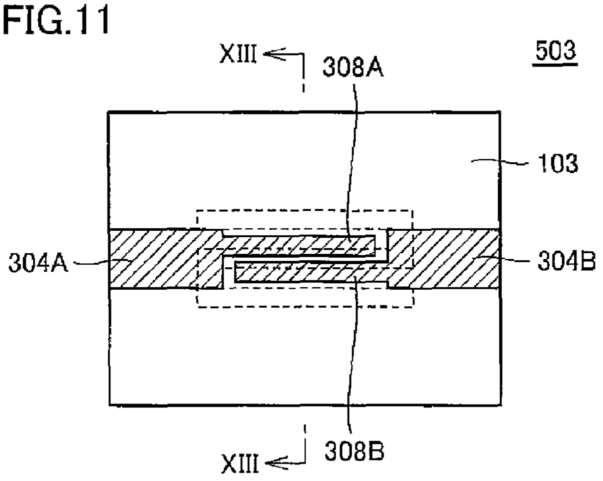
FIG. 11 is a diagram showing a configuration on a surface of a dielectric substrate in a high-frequency circuit according to a third embodiment of the present invention.
Figure 12:
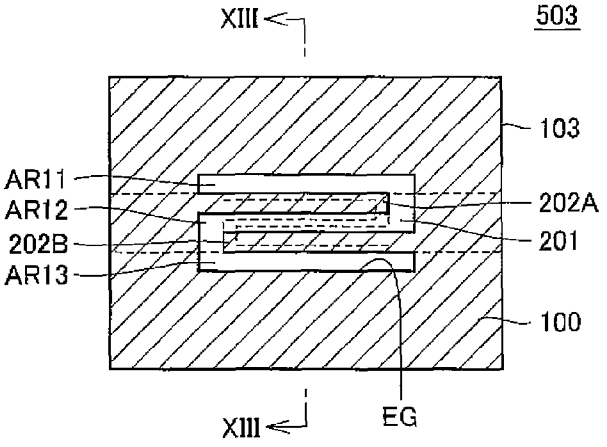
FIG. 12 is a diagram showing a configuration on a back surface of the dielectric substrate in the high-frequency circuit according to the third embodiment of the present invention.

FIG. 11 is a diagram showing a configuration on a surface of a dielectric substrate in a high-frequency circuit according to the third embodiment of the present invention. FIG. 12 is a diagram showing a configuration on a back surface of the dielectric substrate in the high-frequency circuit according to the third embodiment of the present invention. In FIGS. 11 and 12, dotted lines show patterns on the surface and the back surface of the dielectric substrate, respectively.

Figure 13:
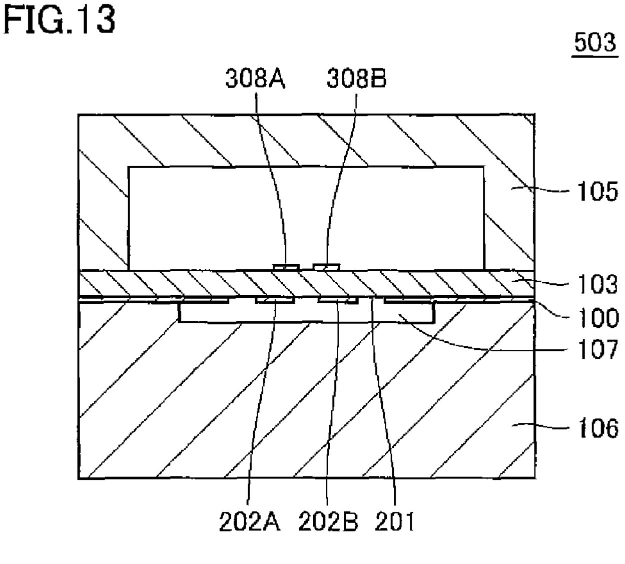
FIG. 13 is a cross-sectional view of the high-frequency circuit according to the third embodiment of the present invention along the line XIII-XIII in FIGS. 11 and 12.

FIG. 13 is a cross-sectional view of the high-frequency circuit according to the third embodiment of the present invention along the line XIII-XIII in FIGS. 11 and 12.

Referring to FIGS. 11 to 13, a high-frequency circuit 503 includes ground conductor 100, pattern cut-out portion 201, stubs 202A, 202B, dielectric substrate 103, microstrip lines 304A, 304B, frame 105, and chassis 106. Microstrip line 304A includes a coupled-line 308A. Microstrip line 304B includes a coupled-line 308B.

Microstrip lines 304A and 304B extend from opposing edge portions of dielectric substrate 103 in a direction opposite to each other. Microstrip line 304A has a first end formed on the edge portion side of dielectric substrate 103 and a second end. Coupled-line 308A is formed on the second end side. The second end of microstrip line 304A, that is, a tip end of coupled-line 308A, is open. Microstrip line 304B has a first end formed on the edge portion side of dielectric substrate 103 and a second end. Coupled-line 308B is formed on the second end side. The second end of microstrip line 304B, that is, a tip end of coupled-line 308B, is open.

In addition, coupled-lines 308A and 308B are arranged in parallel and in proximity to each other. Thus, insertion loss of microstrip lines 304A and 304B is minimized at a certain frequency.

Moreover, coupled-lines 308A and 308B are formed in a portion opposed to pattern cut-out portion 201, with dielectric substrate 103 lying therebetween. According to such a feature, a compact band rejection filter achieving sufficient suppression in a rejection band and minimal insertion loss in a pass band can be obtained.

Figure 14:
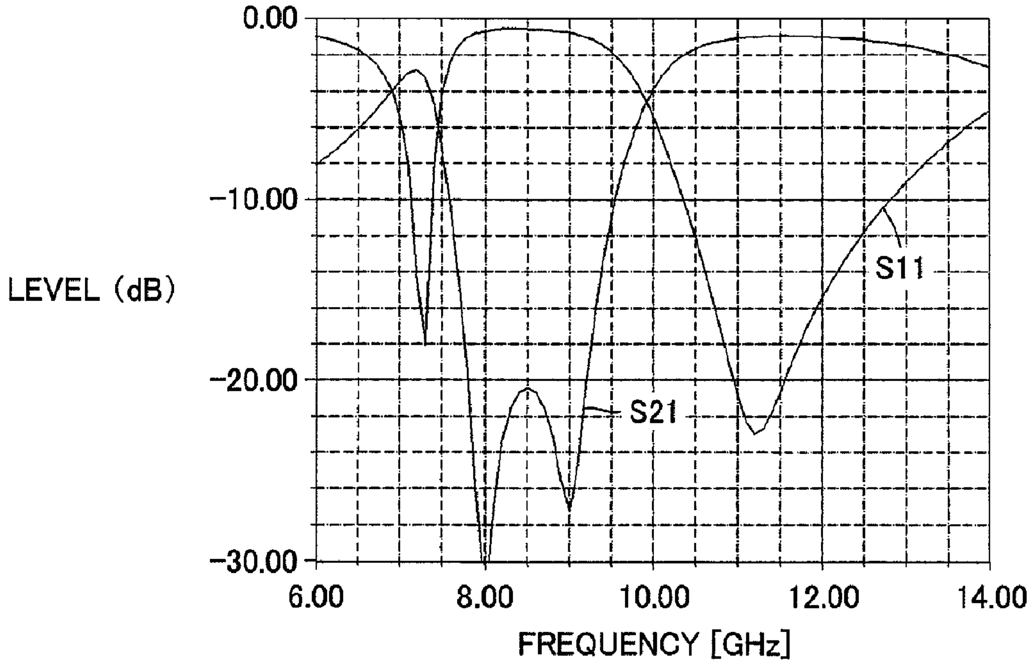
FIG. 14 is a diagram showing an S parameter in the high-frequency circuit according to the third embodiment of the present invention.

FIG. 14 is a diagram showing an S parameter in the high-frequency circuit according to the third embodiment of the present invention. FIG. 14 shows a case where a length of coupled-lines 308A and 308B is set to 4 mm and a length of stubs 202A and 202B is set to 5.95 mm. In FIG. 14, S11 shows a level of a signal reflected by microstrip lines 304A and 304B and S21 shows a level of a signal transmitted through microstrip lines 304A and 304B.

Referring to FIG. 14, high-frequency circuit 503 achieves insertion loss not lower than 10 dB in a range from 7.8 GHz to 8.5 GHz and insertion loss not higher than 1.3 dB in a range from 10.7 GHz to 12.75 GHz.

Therefore, by appropriately setting a length of coupled-lines 308A and 308B and a length of stubs 202A and 202B, a compact band rejection filter achieving sufficient suppression in a rejection band and minimal insertion loss in a pass band can be obtained.

As the configuration and the operation are otherwise the same as in the high-frequency circuit according to the first embodiment, detailed description will not be repeated here. Therefore, the high-frequency circuit according to the third embodiment of the present invention can achieve a smaller size and a simplified layout design.

Another embodiment of the present invention will now be described with reference to the drawings. In the drawings, the same or corresponding elements have the same reference characters allotted, and description thereof will not be repeated.

Fourth Embodiment

The present embodiment relates to a reception device including a high-frequency circuit. The high-frequency circuit here is the same as the high-frequency circuit according to the third embodiment except for the features described below.

Figure 15:
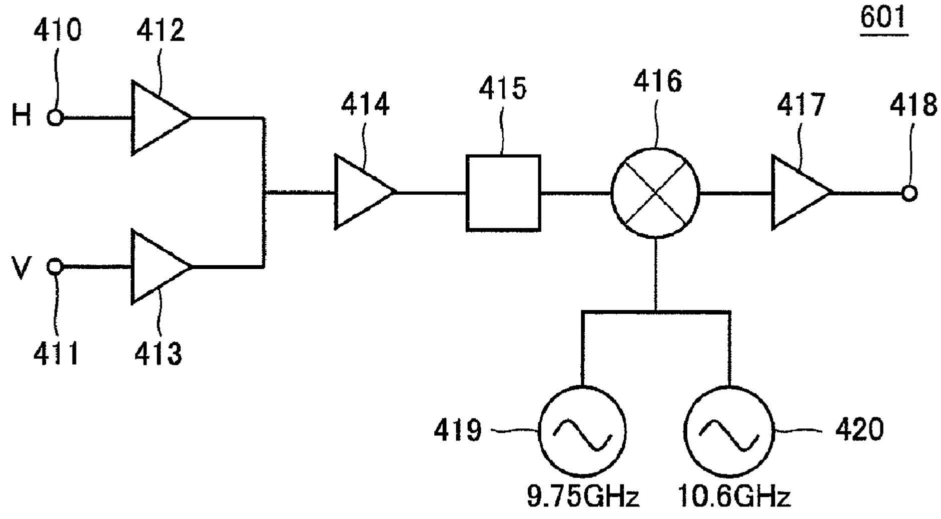
FIG. 15 is a diagram showing a configuration of a reception device according to a fourth embodiment of the present invention.

FIG. 15 is a diagram showing a configuration of a reception device according to the fourth embodiment of the present invention.

Referring to FIG. 15, a reception device 601 is implemented, for example, as a satellite broadcast receiver, and includes a horizontal polarization input terminal 410, a vertical polarization input terminal 411, first-stage low-noise amplifiers 412, 413, a second-stage low-noise amplifier 414, a band rejection filter 415 implemented by high-frequency circuit 503, a mixer 416, an IF amplifier 417, an output terminal 418, a low-band dielectric oscillator 419, and a high-band dielectric oscillator 420.

These functional blocks as well as a power supply circuit, a switch and the like are all formed on a single dielectric substrate. In addition, a horn for reception (not shown) is provided in a chassis (not shown). The horn is connected to horizontal polarization input terminal 410 and vertical polarization input terminal 411 through a probe (not shown).

Switching between horizontal polarization reception and vertical polarization reception can be made by stopping supply of a bias voltage to any one of first-stage low-noise amplifiers 412 and 413. In addition, switching between low-band reception and high-band reception can be made by stopping supply of a bias voltage to any one of low-band dielectric oscillator 419 and high-band dielectric oscillator 420.

For example, when supply of a bias voltage to first-stage low-noise amplifier 413 and high-band dielectric oscillator 420 is stopped, first-stage low-noise amplifier 412 and low-band dielectric oscillator 419 are operating.

Specifically, an RF (Radio Frequency) signal received by horizontal polarization input terminal 410 is amplified by first-stage low-noise amplifier 412 and second-stage low-noise amplifier 414, and the amplified signal passes through image rejection filter 415 and enters mixer 416. Then, a signal at 9.75 GHz output from low-band dielectric oscillator 419 is input to mixer 416. Mixer 416 down-converts the RF signal received from image rejection filter 415 to a signal in an IF (Intermediate Frequency) band and outputs the resultant signal to IF amplifier 417. IF amplifier 417 amplifies the IF signal received from mixer 416 and outputs the resultant signal to the outside from output terminal 418.

By thus switching between the first-stage amplifiers and the dielectric oscillators, reception processing of signals in the total of four bands can be performed.

Figure 16:
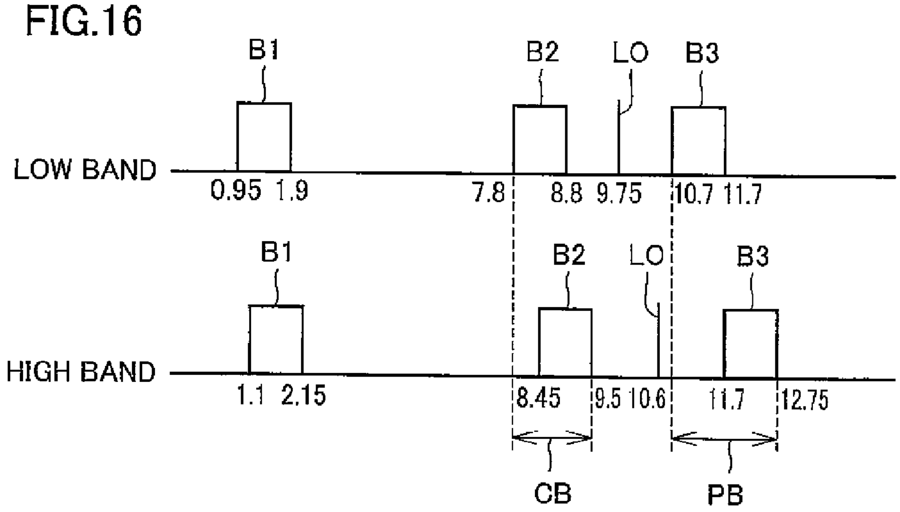
FIG. 16 is a diagram showing a frequency of a signal processed by the reception device according to the fourth embodiment of the present invention.

FIG. 16 is a diagram showing a frequency of a signal processed by the reception device according to the fourth embodiment of the present invention. As the frequency configuration is the same in both of horizontal polarization and vertical polarization, only a frequency configuration in low band and high band is shown in FIG. 16.

Referring to FIG. 16, as to the low band, a local oscillation frequency LO is set to 9.75 GHz and an RF band B3 is in a range from 10.7 GHz to 11.7 GHz. Therefore, an IF band B1 is in a range from 0.95 GHz to 1.9 GHz and an image band B2 is in a range from 7.8 GHz to 8.8 GHz.

In addition, as to the high band, local oscillation frequency LO is set to 10.6 GHz and RF band B3 is in a range from 11.7 GHz to 12.75 GHz. Therefore, IF band B1 is in a range from 1.1 GHz to 2.15 GHz and image band B2 is in a range from 8.45 GHz to 9.5 GHz.

Therefore, in a system as a whole, the image band, that is, a suppression band CB, is in a range from 7.8 GHz to 9.5 GHz, and an RF band, that is, a pass band PB, is in a range from 10.7 GHz to 12.75 GHz. Noise in the image band is down-converted to a signal in the IF band by mixer 416. Accordingly, noise in the image band should sufficiently be attenuated by image rejection filter 415.

Here, the reception device according to the fourth embodiment of the present invention includes high-frequency circuit 503 as the image rejection filter. According to such a feature, noise in the image band from 7.8 GHz to 9.5 GHz can be attenuated.

In a conventional half-wave filter, at least two half-wave resonators having a length of approximately 8 mm and a coupled-line portion having a length of approximately 4 mm in each of an input portion and an output portion were required. Image rejection filter 415 in the reception device according to the fourth embodiment of the present invention, however, can achieve a significantly smaller size than the conventional half-wave filter, because only the coupled-line having a length of 4 mm is formed on the surface of the dielectric substrate. Consequently, an outer dimension of the dielectric substrate can be made smaller, and hence the number of dielectric substrates obtained from a dielectric substrate of a certain size, for example, for one reception device 601, can be increased, which leads to reduction in cost.

Another embodiment of the present invention will now be described with reference to the drawings. In the drawings, the same or corresponding elements have the same reference characters allotted, and description thereof will not be repeated.

Fifth Embodiment

The present embodiment relates to a reception device including a compact transistor. The reception device here is the same as the reception device according to the fourth embodiment except for the features described below.

Figure 17:
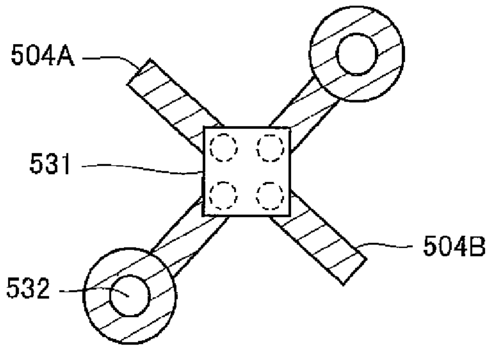
FIG. 17 is a plan view showing a configuration of a transistor used in a reception device according to a fifth embodiment of the present invention.
Figure 18:
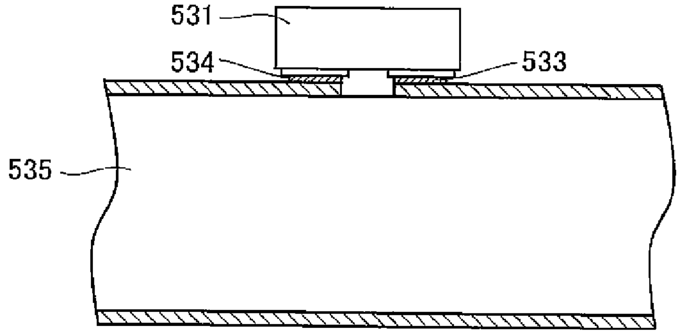
FIG. 18 is a cross-sectional view showing the configuration of the transistor used in the reception device according to the fifth embodiment of the present invention.

FIG. 17 is a plan view showing a configuration of a transistor used in a reception device according to the fifth embodiment of the present invention. FIG. 18 is a cross-sectional view showing the configuration of the transistor used in the reception device according to the fifth embodiment of the present invention.

Referring to FIGS. 17 and 18, a high electron mobility transistor HTR includes a bare chip 531 and an electrode 534.

In the reception device according to the fifth embodiment of the present invention, for example, first-stage low-noise amplifiers 412, 413, second low-noise amplifier 414, and mixer 416 are formed by using flip-chip-mounted high electron mobility transistor HTR.

Electrode 534 on bare chip 531 is attached directly onto dielectric substrate 535 with solder 533. A source electrode of high electron mobility transistor HTR is grounded through a via hole 532. A gate electrode and a drain electrode of high electron mobility transistor HTR are connected to microstrip lines 504A and 504B respectively.

A conventional, packaged high electron mobility transistor has a main body of approximately 2 mm square and an electrode connected to a lead. On the other hand, high electron mobility transistor HTR according to the fifth embodiment of the present invention has a size of approximately 300 μm square, which is extremely smaller than the conventional, packaged high electron mobility transistor. In addition, as compared with the conventional, packaged high electron mobility transistor, high electron mobility transistor HTR does not include wire bonding or the like. Therefore, parasitic inductance and parasitic capacitance are small and gain of the amplifier or the like can be improved.

Meanwhile, as the parasitic inductance and the parasitic capacitance due to wire bonding or the like are small, matching is achieved over a wide band and accordingly gain in the image band is also great.

The reception device according to the fifth embodiment of the present invention, however, includes high electron mobility transistor HTR together with image rejection filter 415. Therefore, a signal in the image band can be suppressed and an area of the dielectric substrate can significantly be made smaller.

The reception device according to the fifth embodiment of the present invention is configured such that first-stage low-noise amplifiers 412, 413, second-stage low-noise amplifier 414, and mixer 416 are formed by using flip-chip-mounted high electron mobility transistor HTR, however, the reception device is not limited as such. The configuration may be such that flip-chip-mounted high electron mobility transistor HTR is used for a part of these functional blocks and a packaged high electron mobility transistor is used for other functional blocks.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A high-frequency circuit, comprising:

a dielectric substrate;

a stripline formed on a surface of said dielectric substrate;

a ground conductor provided on a back surface of said dielectric substrate, in which a pattern cut-out portion through which a part of the back surface of said dielectric substrate is exposed is formed; and a first stub having a first end connected to an edge portion of said ground conductor defining said pattern cut-out portion and a second end arranged at a distance from said edge portion, wherein said stripline and said first stub are arranged in parallel one above the other, said high-frequency circuit attenuates a component of a prescribed frequency in a signal that passes through the stripline, and said first stub has an electrical length comparable to approximately ¼ of a wavelength corresponding to said prescribed frequency.

2. The high-frequency circuit according to claim 1, wherein in said pattern cut-out portion, a first space and a second space are formed on opposing sides of said first stub, and said first space and said second space are connected to each other around the second end of said first stub.

3. The high-frequency circuit according to claim 1, further comprising a second stub having a first end connected to the edge portion of said ground conductor defining said pattern cut-out portion and a second end arranged at a distance from said edge portion.

4. The high-frequency circuit according to claim 3, wherein said first stub and said second stub extend from said edge portion in a direction opposite to each other.

5. The high-frequency circuit according to claim 3, wherein said first stub and said second stub are arranged in parallel, at a prescribed distance from each other.

6. The high-frequency circuit according to claim 1, wherein said stripline includes a coupled-line formed in a portion opposed to said pattern cut-out portion, with said dielectric substrate being interposed.

7. A high-frequency circuit, comprising;

a dielectric substrate;

a stripline formed on a surface of said dielectric substrate;

a ground conductor provided on a back surface of said dielectric substrate, in which a pattern cut-out portion through which a part of the back surface of said dielectric substrate is exposed is formed;

a first stub having a first end connected to an edge portion of said ground conductor defining said pattern cut-out portion and a second end arranged at a distance from said edge portion, wherein said stripline and said first stub are arranged in parallel one above the other; and a metal chassis having a gap in a top surface thereof facing the pattern cut-out portion and the stub with the gap having a depth such that the pattern cut-out portion and the stub are not in contact with the top surface of said metal chassis that is in contact with said ground conductor surrounding said pattern cut-out portion and said first stub at a distance therefrom defined by an edge of the gap.

8. The high-frequency circuit according to claim 7, further comprising a metal frame positioned to contact the surface of said dielectric substrate on which the stripline is formed, the frame being further configured to extend over the area of the dielectric substrate on which the stripline is formed without contacting the stripline.

9. A reception device, comprising:

a filter outputting a received radio signal after attenuating a frequency component thereof outside a prescribed frequency band; and a mixer circuit frequency-converting said radio signal received from said filter, said filter including a dielectric substrate, a stripline formed on a surface of said dielectric substrate, a ground conductor provided on a back surface of said dielectric substrate, in which a pattern cut-out portion through which a part of the back surface of said dielectric substrate is exposed is formed, and a first stub having a first end connected to an edge portion of said ground conductor defining said pattern cut-out portion and a second end arranged at a distance from said edge portion, wherein said stripline and said first stub are arranged in parallel one above the other, said filter attenuates a component of a prescribed frequency in a signal that passes through the stripline, and said first stub has an electrical length comparable to approximately ¼ of a wavelength corresponding to said prescribed frequency.

10. The reception device according to claim 9, wherein said mixer circuit includes a flip-chip-mounted high electron mobility transistor.

* * * * *